Feb. 7, 1967 J. E. COPENHEFER 3,303,010
METHOD AND APPARATUS FOR MAKING FILAMENTOUS MATS
Filed Feb. 24, 1964 3 Sheets-Sheet 1

INVENTOR.
JOHN E. COPENHEFER
BY Edward C. Arenz
ATTORNEY

Feb. 7, 1967    J. E. COPENHEFER    3,303,010
METHOD AND APPARATUS FOR MAKING FILAMENTOUS MATS
Filed Feb. 24, 1964    3 Sheets-Sheet 2

0 OSC.
0 ROT.

¼ OSC.
95° ROT.

½ OSC.
190° ROT.

¾ OSC.
285° ROT.

1 OSC.
380° ROT.

INVENTOR.
JOHN E. COPENHEFER
BY
*Edward C. Arenz*
ATTORNEY

United States Patent Office 3,303,010
Patented Feb. 7, 1967

---

3,303,010
METHOD AND APPARATUS FOR MAKING FILAMENTOUS MATS
John E. Copenhefer, Anchorage, Ky., assignor to American Air Filter Company, Inc., Louisville, Ky., a corporation of Delaware
Filed Feb. 24, 1964, Ser. No. 346,951
14 Claims. (Cl. 65—11)

This invention relates to making filamentous mats.

Weber U.S. patent application S.N. 222,403, filed September 10, 1962 discloses a method of forming a mat by winding filamentous material upon the circumferential surface of a former (usually a cylinder) while the former is both rotating upon its longitudinal axis and is also being moved in a rotary oscillating motion about another axis. After a cylindrical mat of desired thickness is formed upon the circumferential surface of the cylinder, the cylindrical mat is slit along an axial line and unwrapped from the cylinder to form a planar mat. The dimensions of the so-formed planar mat are limited by the dimensions of the drum, i.e., its length is equal to the circumference of the cylinder, and its width is limited to a width somewhat less than the axial length of the cylinder.

This invention is concerned with a method for making a filamentous mat generally in accordance with the above noted manner, but which has a length substantially greater than the circumference of the cylinder. This is accomplished by introducing sheet material onto the cylinder circumferential surface at the same time that the filaments are being wound thereon but with a substantial number of turns of filaments being wound for each complete turn of the sheet material so that the mat in its completed form is composed of a number of convoluted layers separated by convoluted layers of sheet material alternating with the mat layers. After the winding is completed, the layers of filamentous mat may be successively unwound from the cylinder as a length of mat substantially longer than the circumference of the cylinder.

Some preliminary observations regarding the general method disclosed in the noted Weber application may be of assistance in understanding the present invention. In winding filaments upon a cylinder which both rotates and oscillates the filamentous material winds around the cylinder and also traces a path back and forth along a portion of the axial length of the cylinder with each rotary oscillation cycle. The number of turns of filamentous material deposited on the cylinder during an oscillation is generally dependent upon the ratio of the number of cylinder rotations about its own axis to a single rotary oscillation. Regardless of the ratio however, at the completion of each rotary oscillation cycle, the filamentous material will be disposed, with respect to the length of the cylinder, in the same location as it was disposed at the completion of the previous rotary oscillation cycle and each preceding rotary oscillation cycle. For example, assuming that the beginning of a rotary oscillation cycle starts with the filamentous material being wound adjacent an end of the cylinder, the filamentous material is again being wound adjacent that end of the cylinder at the end of the next successive and each following successive rotary oscillation cycle. This applies even though the filamentous material has indexed around the circumferential surface of the cylinder during the cycles.

In accordance with the invention, a supply of sheet material orbits the cylinder in synchronism with the rotary oscillation motion of the cylinder. The supply of sheet material may conveniently be in the form of a roll of paper which has its axis disposed parallel to the axis of the cylinder, and the path of motion of the roll is such that its axis is maintained parallel to the axis of the cylinder as the cylinder oscillates. Paper is fed off the roll onto the circumferential surface of the cylinder at a rate in accordance with the difference between the angular velocity of the rotating cylinder, and the angular velocity of the rotary oscillating motion. In other words, the paper is fed onto the cylinder at the same rate that successive turns of filament index around the cylinder.

To permit the simultaneous winding of filaments and sheet material on the cylinder, the supply roll of sheet material is disposed with its length offset with respect to the length of the cylinder to the extent that a plane passing through the one extreme edge of the built-up mat on the cylinder will lie beyond the one end of the sheet material supply roll. With this disposition of the sheet material supply roll relative to the cylinder, the filaments will pass beyond, or loop around, the offset end of the supply roll once during each rotary oscillating cycle. In a sense it may be said that the filaments dodge the offset end of the supply roll.

The invention will be described in more detail in connection with the accompanying drawing wherein.

Figure 1:
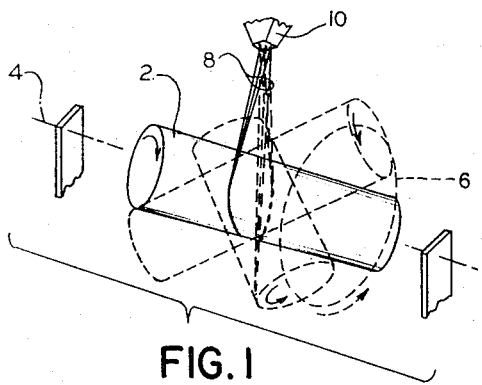
FIGURE 1 is a largely schematic perspective view generally illustrating the movement of a cylinder upon which filaments are wound after issuing from the furnace.

Drum movement generally (FIG. 1)

While the general character of movement involved is illustrated in FIG. 1 with the rotating and oscillating former being a right cylinder or drum 2, it is noted that formers which are other than circular in cross section are also adapted to be used in carrying out the invention. Thus, formers which are elliptical in cross section, or which even have opposite plane surfaces may be used instead of a cylinder. The drum is shown in three successive positions, approximately 120° removed from each other, during an oscillating revolution about a horizontal axis 4 which intersects the drum longitudinal axis at an angle of about 45° at the center of the drum. The direction of rotation of the drum about its longitudinal axis is indicated by the solid line arrows on the ends of the drum. The direction of drum oscillation is the same and is indicated by the broken line arrow adjacent the broken line orbit 6 tracing the path of the right end of the drum about the axis 4. As the drum both rotates and oscillates, glass fiber filaments 8 issuing from a supply of molten glass in furnace 10 are drawn by and wound upon the drum in successive turns which ultimately form a cylindrical compact mat. The axial length of the drum relative to its diameter is exaggerated in FIG. 1 for purposes of clarity.

Figure 3:
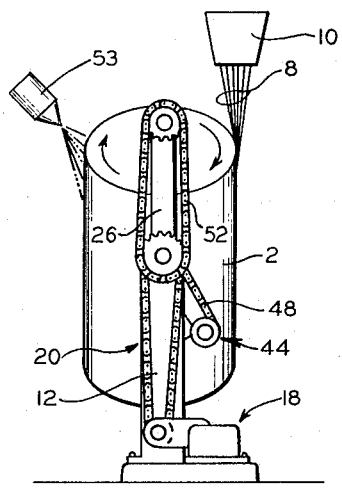
FIGURE 3 is an end view of the apparatus of FIGURE 2.
Figure 2:
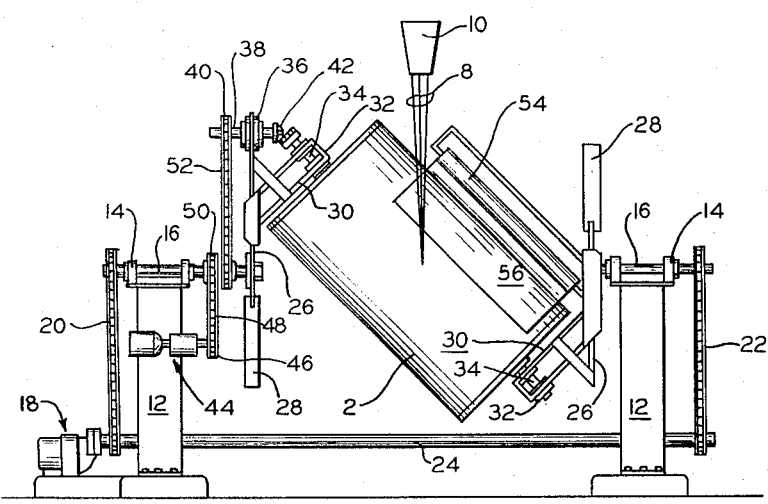
FIGURE 2 is a front view of one form of apparatus for carrying out the invention.

Apparatus (FIGS. 2 and 3)

One example of presently preferred apparatus used to make a mat according to the invention will be described in connection with FIGURES 2 and 3. The drum 2 is carried between a pair of spaced apart pedestals 12 which are securely anchored to the floor and which have bearings 14 mounted on their upper ends to carry a pair of opposite and aligned shafts 16. Both of the shafts 16 are rotated together by an electric motor and gear reducer assembly 18 which drives left shaft 16 through one chain and sprocket arrangement generally designated 20, and drives the right shaft 16 through another chain and sprocket arrangement generally designated 22. The right chain and sprocket arrangement 22 is driven through a long shaft 24 journalled in bearings carried by the lower portion of the pedestals.

The drum 2 is disposed between the two pedestals 12 with the drum longitudinal axis being intersected at its center by the common axis of the aligned shafts 16. The means which supports the drum between the pedestals and makes the driving connection between the shafts 16 and the respective ends of the drum for moving the drum in oscillating fashion includes certain corresponding members to which identical reference numerals are applied. These members include the oppositely-directed arms 26 which are rigidly secured to the inner ends of the shafts 16 for rotation therewith in a vertical plane, the counter-weights 28 carried on one end of the arms 26, the open-frame connecting members 30 connected at one end to the arms 26 and extending inwardly from the arms at an angle such that they lie parallel to the ends of the drum and to each other, and several bracing members (not numbered) which impart rigidity and strength to the connecting assemblies as a whole. Both of the open frames 30 carry bearings 32 which receive the projecting axles 34 of the drum 2. With the arrangement thus far described, the drum can be driven in the rotary oscillating motion.

For rotating the drum about its axis, it is preferred that independent drive means be provided so that the speed ratios of drum rotation to drum oscillation can be changed easily. The mechanism included in such independent drive means will now be described. The left arm 26 has a bearing 36 on its end opposite the counterweight. This bearing carries a shaft 38 having a sprocket 40 on one end and a bevel gear 42 on the other end. The gear 42 meshes with another bevel gear fixed to the one end of the drum axle 34. A separate electric motor and gear reducer assembly 44 mounted on the left pedestal 12 is the source of rotating power for the drum, and is connected to drive sprocket 40 through reduced sprocket 46, chain 48, double sprocket 50 mounted on the left shaft 16 and freely rotatable independently of the shaft, and chain 52. The gear reducer is of the type which may be adjusted to vary its output speed.

The furnace 10 is positioned, as viewed from in front (FIG. 2), centrally above the drum with the rows of orifices in its bottom wall through which filaments 8 descend generally parallel to and generally centered on the vertical plane which is perpendicular to the oscillating axis 4 and intersects the center point of the drum. As shown in FIGURE 3, the furnace position as viewed from the side of the apparatus is offset from a vertical plane containing the oscillating axis 4 so that with the arms 26 in vertical positions, the orifices are substantially directly above that part of the down-turning surface of the drum which would be tangent to a vertical plane. The exact position of the furnace with respect to being on one side or the other of the vertical plane coinciding with oscillating axis 4 is not critical since the oscillating path of the drum is the same as viewed from any position in a plane perpendicular to the oscillating axis and intersecting the center of the drum, and the filaments 8 will take a path which is tangential to the drum surface receiving the filaments. However, since presently preferred practice is to feed filaments directly from the furnace to the drum without any intermediate guiding or gathering means, and since from the standpoint of minimizing fiber-breakout it is best to pull the fibers straight out of the furnace, a furnace position generally corresponding to FIGS. 2 and 3 is preferred.

It is usually desirable that a resin be applied to the filaments before winding or to the mat as it is being formed on the drum. Thus a suitable applicator such as one or more nozzles 53 is provided for spraying the resin on the mat during formation.

Sheet material supply

In accordance with this invention, a supply of sheet material (e.g., paper) is provided in the form of a roll 54 having one end supported from one of the arms 26 to extend parallel to the longitudinal axis of the drum. The roll 54 is free to rotate as required to feed the paper 56 from the roll onto the drum circumference. Any suitable arrangement may be used to support the roll in the disposition shown. It will be apparent that as the drum is driven in its rotary oscillating movement, the roll moves with the drum in somewhat orbital fashion by virtue of the means supporting the roll being secured to the one arm 26.

As shown in FIG. 2, the length of the roll 54 is offset with respect to the length of the drum to permit the filaments 8 to pass around, i.e., dodge, the left end of the roll once during each rotary oscillating cycle. The dodging of the end of the roll by the filaments, when an arrangement as shown in FIG. 2 is used, will occur when the drum axis is substantially horizontal and with the left end of the drum projecting forwardly and the right end rearwardly. The roll 54 is of course then in a position in front of the drum, and also extending horizontally. The method of the invention will be described in somewhat more detail in connection with FIGS. 4–13 which illustrate in sequence how the filaments are wound in relation to the winding of the paper.

Drum positions during winding (FIGS. 4–13)

FIGURES 4–13 illustrate by way of front and corresponding side views of the drum, successive stages of winding one filament, or a number of filaments in one group, during a period in which the drum rotates on its axis one turn plus a fraction while it is passing through one rotary oscillating cycle. To promote clarity in further description, this term cycle will only be used in connection with an oscillation, and all ratios will be based upon a single oscillating cycle. The direction of oscillation is shown by arrows adjacent the drum in the side views, while the direction of rotation of the drum on its axis is shown by the arrows on the ends of the drum.

The ratio of drum rotations to a single rotary oscillating cycle for the illustration of FIGS. 4–13 is slightly in excess of 1 to 1 so that the circumferential surface of the drum completes just over one complete turn while the drum is being oscillated once. If the drum were not being independently rotated upon its own axis, a single oscillating cycle would result in a single turn of the drum surface, i.e., a 1 to 1 ratio. Hence it will be appreciated that in the example of FIGS. 4–13 the drum is being independently rotated upon its axis at a very slow speed. If it is assumed for purposes of illustration that while the drum is being moved through a single oscillating cycle that the drum is being independently rotated 20° upon its axis, then at the end of a complete oscillating cycle the surface of the drum will have moved through 380°. The degree of rotation of the drum surface at various points during the oscillating cycle is stated in the legends between the corresponding front and side views of FIGS. 4–13.

Figure 4:
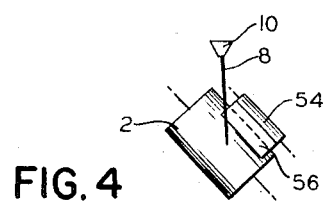
FIGURES 4–13 illustrate stages of winding a filament upon a cylinder or drum showing successive positions of the drum as viewed from both the front and the side during a single rotary oscillating cycle, and with the drum having rotated on its own axis slightly more than once during the cycle.
Figure 5:
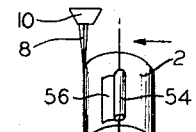
Figure 6:
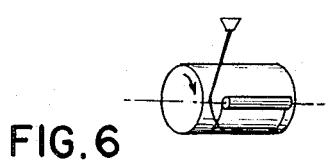
Figure 7:
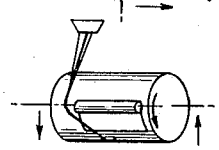
Figure 8:
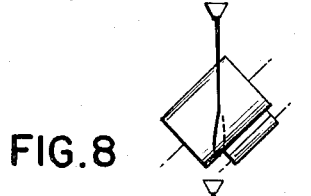
Figure 9:
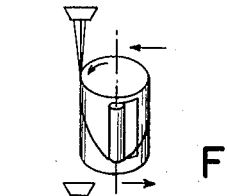
Figure 10:
Figure 11:
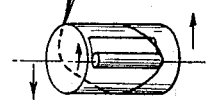
Figure 12:
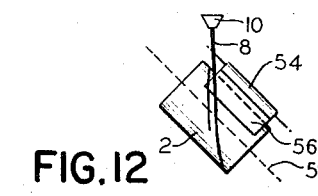
Figure 13:
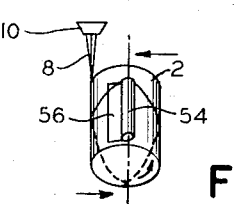

The drum in FIGURES 4 and 5 is shown at a time during the cycle when the filament 8 is being wound through the center portion of the drum. In FIGURES 6 and 7, the drum has passed through one-fourth of its oscillating cycle and has rotated 95° so that the filament has been wound just over one-fourth of the way around the drum and has traversed out along the axial length of the drum toward its left end. In FIGURES 8 and 9, the drum has moved through half its oscillating cycle and the drum surface has moved through 190° so that the filament has been wound 10° past a half turn around the drum and has traversed back along the length of the drum to the central portion. FIGURES 10 and 11 show the drum at three-fourths of a cycle and 285° rotation of the drum surface, and FIGURES 12 and 13 show the drum in the same position as FIGURES 4 and 5 at the completion of the cycle but with the drum surface having rotated 380°. The filament has made a single turn around the drum plus 20° and has traversed the axial length of the filament receiving portion of the drum circumference twice in going from the center to the left end, then to the right end, and then back to the center.

The generally orbital path of the roll 54 around the drum during the single oscillating cycle is also shown, as well as the manner in which the filament dodges the left end of the roll when the left end of the drum swings forwardly and downwardly (FIGS. 6 and 7). FIGS. 4–13 also illustrate that the axis of the roll 54 is parallel to the drum axis, and the axis of the roll moves in a path during the drum oscillation in which the roll axis remains parallel to the drum axis.

The paper 56 feeds off the roll 54 onto the drum at a rate corresponding to the rate at which the drum circumference advances during each cycle. Thus, if during a single oscillating cycle the drum surface passes through 380° then the length of paper fed onto the drum surface will be equal to the length of an arc subtending an angle 20° of a circle having a radius equal to the radius of the drum. At this ratio of the example, the surface of the drum will be covered with one layer of paper from the supply roll after eighteen oscillating cycles, and with two layers after thirty-six cycles, etc.

Figure 14:
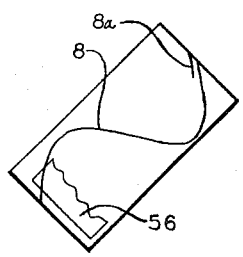
FIGURE 14 is a developed view of the drum surface of FIGURE 12.

If the surface of the drum 2 having the single filament turn plus 20° were cut along the line 58 of FIG. 12 and unwrapped and laid out in developed form, the trace of a filament 8 during the single oscillating cycle would appear generally as shown in FIG. 14. This view also shows the leading edge portion of the paper 56. The 20° part of the filament is designated 8a.

The ratio example of one and one-eighteenth rotation of the drum surface to one oscillating cycle has been used to emphasize the indexing of the drum surface during each cycle. This ratio would of course result, after eighteen cycles, in a completed mat pattern which includes only eighteen turns of a single filament, or single group of filaments, with the spacing between successive turns being rather wide. In actual practice a ratio of, say, one and one twenty-five-hundredths rotations to each oscillating cycle is preferred. This ratio results in the successive turns of filaments being closely spaced and provides a high density final mat. With this ratio, a completed pattern consists of twenty-five hundred and one turns of filaments or groups of filaments wound during twenty-five hundred oscillations. Depending upon filament diameter and number, and diameter of drum, other ratios obviously may be selected.

Since the paper 56 is pulled off the roll 54 onto the drum surface at the same rate that the drum surface indexes around during each oscillation, with the last noted ratio the drum surface will be wrapped with the first layer of paper after the twenty-five hundred oscillations.

The path that the filaments trace is described in some detail in the noted Weber patent application, but for present purposes may be considered as having the general configuration of a sine wave as shown in FIG. 14. With a rotation to oscillations ratio close to unity, each filament turn around the drum traces a path which is correspondingly close to 360° of a sine wave. Each successive turn is out-of-phase (or indexed around the drum) from the preceding turn to the extent that the ratio varies from unity. It is a result of the out-of-phase relationship that each layer of the mat is completed, or filled in with filaments, after a sufficient number of oscillation cycles have occurred.

*Stages in building a layer (FIGS. 15–24)*

FIGS. 15–24 are graphical representations illustrating, in stages, the relative positions of successive turns of filaments portrayed on a drum surface laid out in planar, developed form, with successive figures being indexed around the drum surface an amount corresponding to the indexing of the filaments around the drum surface with each oscillation cycle. The advance of the leading edge of the paper around the drum surface at the same rate that the successive filament turns index around the drum surface is also shown. The lines representing the filaments are of saw-tooth shape rather than sine-wave shape for simplicity.

The height of the figures represents the dimension of the mat extending in the same direction as the axis of the drum, and the width represents the circumferential dimension of the drum. The heavy line 54 represents the paper roll, the parallel line identified by numeral 60 is the leading edge of the paper, and 56 is the area of paper on the drum. Successive turns are identified by the successive letters a, b, c, etc.

The views of FIGS. 15–24 may be explained in another way as what one would see, from a position in a plane in which both the drum axis and the roll 54 axis lie, if the drum surface were slit along an axial line on the surface of the drum diametrically opposite the roll 54 and laid out flat, and the views were made at the end of each oscillation cycle.

Figure 15:
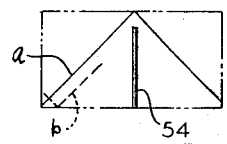
FIGURES 15–24 are graphical representations of successive stages during the winding of a single layer of mat.
Figure 20:
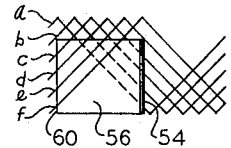
Figure 16:
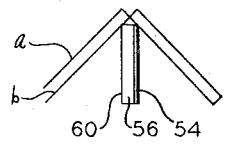

Beginning with FIG. 15, it will be seen that the crest of the first turn, a, wound on the drum dodges or loops around the end of the roll 54. The broken line b in this view represents the continuation of turn a beginning its second turn around the drum. However, for purposes of clarity, only one additional turn around the drum is shown in each successive view, and the broken line b of FIG. 15 simply shows its potential position relative to the first turn a. FIG. 16 shows the complete turn b and the advance of paper 56 onto the drum surface for a distance corresponding to the indexing of turn b around the drum relative to turn a.

Successive views show the addition of successive turns and the advance of the paper 56 in accordance with the indexing of the turns around the drum. In each case the last turn wound dodges the one end of the roll 54, and the leading edge of the paper is always even with the crest of turn a appearing at the top of the views.

Figure 21:
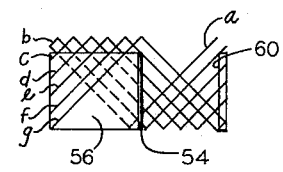
Figure 17:
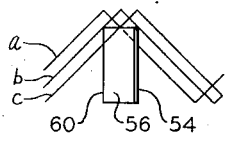
Figure 22:
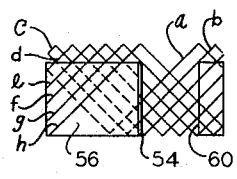
Figure 18:
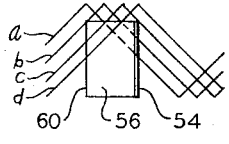

It will be seen that as the turns index around the drum, with the paper simultaneously unwinding from the roll 54, each successively laid turn crosses over the leading edge 60 of the paper in one direction and extends across the paper to the side edge thereof where the crest dodges the roll end and extends in the other direction toward the other end of the drum. Beginning with turn g however, the beginning edge of the paper has advanced sufficiently that turn g crosses the leading edge of the paper in the other direction (FIG. 21).

Figure 23:
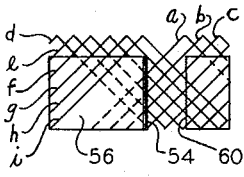
Figure 19:
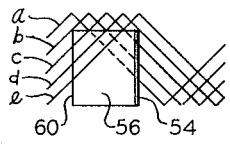

Taking turn e as an example, it will be seen that in FIG. 19 it lies across the paper, then crests around the roll 54, and extends from left to right downwardly in crossing relation to turns a–d. In FIG. 23, it will be seen that part of the same turn e now lies under the additionally unrolled paper and in crossing relation to other turns also lying under the paper, and part of turn e lies on top of the paper adjacent the beginning edge 60 in crossing relation to parts of later turns f–i, also lying on top of the paper.

Figure 24:
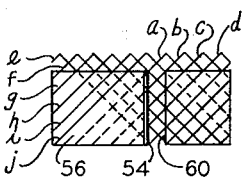

In FIG. 24 it will be seen that there are crossing parts of turns both overlying and underlying the paper 56 with the layer of crossing turns overlying the paper adjacent the leading edge 60 in a position to advance, with the leading edge, beneath the paper unwinding from the roll 54. Thus as the process continues, convoluted layers of paper alternating with convoluted layers of mat comprised of turns crossing with other turns are built up on the drum surface until a desired length of mat is formed. Each layer of mat between adjacent layers of paper is a composite of two sub-layers, each sub-layer comprising filaments which extend generally parallel to each other and in crossing relation to the filaments of the other sub-layer. In its presently preferred form, the filaments of each sub-layer are sufficiently numerous that they touch and form a sheet as distinguished from an openwork net or web. Thus, the number of turns shown in FIGS. 15–24 are few for purposes of clarity only, although the inventive concept is equally applicable regardless of the number of turns.

Figure 25:
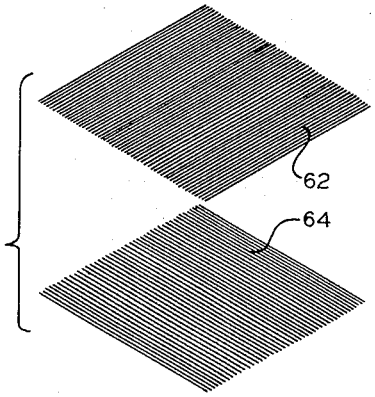
FIGURE 25 illustrates a fragmentary portion of a mat made according to the invention.

A segment of a layer of a preferred type of mat taken from the generally central portion of the finished mat is shown in FIG. 25 with the two filamentous sub-layers 62 and 64 separated.

*Mat removal from drum*

After the desired length of mat is formed on the drum, the drum is stopped and the mat is unwound with the paper from the drum and rolled up onto the mandrel of the paper roll 54 or onto some other suitable mandrel. However, since a part of the mat wound on the drum is not separated by layers of paper, this part of the mat which has been formed by the parts of the turns dodging the roll 54 is trimmed-off back to the edge of the paper before the unwinding of the mat and paper from the drum. Both the crest edge portions of the mat (i.e., the crest edge portion separated into layers by the paper as well as the crest edge portion deposited beyond the edge of the paper) are now considered as waste material because of the angles formed by the crossing turns in the crest portions being considerably different from the angles between crossing turns in the central portion of the mat. Thus both of these crest areas may be trimmed off before unwinding the mat and paper from the drum, or alternatively only the unlayered edge portion need be trimmed off before unwinding from the drum.

While the description has used certain examples for purposes of explanation, it is to be emphasized that various departures from the examples may be made without departing from the scope of the invention. As one example, the separating material 56 need not be paper but may well be some other material. As another example, the ratio of drum rotations to drum oscillations may be less than unity rather than greater than unity, in which case the sheet material advances around the drum in the direction opposite to that which has been described. Further, while filaments of glass are presently contemplated as preferred, the concept may be carried out using filaments of other material. Still other departures will suggest themselves in light of the inventive concept herein disclosed.

I claim:

1. The method of making a filamentous mat, comprising:
    (a) feeding a filament to a former while rotating said former on its longitudinal axis and simultaneously moving said former in a rotary oscillating manner about another axis intersecting said longitudinal axis;
    (b) controlling said rate of rotation of said former, relative to the rate of oscillation of said former, that successive turns of said filament are successively indexed around said former; and
    (c) feeding sheet material onto the circumferential surface of said former at the same rate as said successive turns are indexing around said former.

2. The method according to claim 1 wherein:
    (a) said former is a right cylinder.

3. The method according to claim 1 including:
    (a) applying a binder to said filaments.

4. The method according to claim 1 including:
    (a) terminating said rotation and oscillation of said former; and
    (b) unwinding the layers of mat formed of said turns of filament together with the alternating layers of said sheet material.

5. The method of making a filamentous mat, comprising:
    (a) feeding a filament to a cylinder while rotating said cylinder on its longitudinal axis and simultaneously moving said cylinder in a rotary oscillating manner about another axis intersecting said cylinder longitudinal axis;
    (b) controlling said rate of rotation of said cylinder, relative to the rate of oscillation of said cylinder, that successive turns of said filament are successively indexed around said cylinder; and
    (c) feeding sheet material onto said cylinder from a supply of said sheet disposed with its axis parallel to said longitudinal axis of said cylinder and moving in a path paralleling the oscillating path of said cylinder at the same rate as the rate of rotary oscillation of said cylinder.

6. The method of making a filamentous mat, comprising:
    (a) feeding a filament to a cylinder while rotating said cylinder on its longitudinal axis and simultaneously moving said cylinder in a rotary oscillating manner about another axis intersecting said cylinder longitudinal axis;
    (b) controlling said rate of rotation of said cylinder, relative to the rate of oscillation of said cylinder, that each successive turn of said filament is indexed around said cylinder from the previous turn;
    (c) moving a roll of sheet material, having its axis disposed generally parallel to said cylinder longitudinal axis, in a path in which said roll axis remains parallel to said cylinder axis as said cylinder is moved in said rotary oscillating manner; and
    (d) feeding sheet material from said roll onto the circumferential surface of said cylinder at the same rate as successive turns are indexing around said cylinder.

7. The method of making a filamentous mat, comprising:
    (a) feeding a filament to a former while rotating said former on its longitudinal axis and simultaneously moving said former in a rotary oscillating manner about another axis intersecting said longitudinal axis, said rotating and oscillating motion causing said filament to traverse back and forth along a portion of the axial length of said former as said filament is being wound around said former;
    (b) controlling the rate of said rotation of said former relative to the rate of said oscillation that each successive turn of said filament is indexed around said former from the previous turn;
    (c) moving a roll of sheet material,
        (c-1) having its axis disposed generally parallel to said former longitudinal axis,
        (c-2) and its length offset with respect to the length of said former so that said filament may loop around one end of said roll once during each of said oscillations,
    in a path in which said roll axis remains parallel to said former axis as said former is moved in said oscillating manner; and
    (d) feeding sheet material from said roll onto the surface of said former at the same rate that successive turns are indexing around said former to build up said former a continuous length of mat in convoluted layers separated from each other by alternating layers of said sheet material.

8. The method of claim 7 including:
    (a) stopping said former and the feed of said filament and said sheet material after a desired length of said mat is formed; and (b) unwinding said layers of mat and said sheet material together from said former.

9. A method of making a filamentous mat, comprising:
   (a) rotating a cylinder on its longitudinal axis at one angular velocity;
   (b) simultaneously moving said cylinder in a rotary oscillating motion at a different angular velocity about an axis intersecting said cylinder axis at an acute angle;
   (c) feeding a filament to said cylinder for winding thereon while said cylinder is rotating and oscillating;
   (d) providing a supply of sheet material adjacent the circumferential surface of said cylinder for movement in synchronism with said rotary oscillating motion, and in a path in which the axis of said supply of sheet material remains substantially parallel to said cylinder longitudinal axis; and
   (e) feeding said sheet material from said supply onto said cylinder at a rate in accordance with the indexing of successive turns of said filament around said cylinder resulting from the difference in said angular velocities.

10. A method of making a filamentous mat, comprising:
    (a) winding a filament on the circumferential surface of a cylinder while said cylinder is rotating on its longitudinal axis at one angular velocity and is being moved in a rotary oscillating motion at a different angular velocity, to form said filamentous mat of turns of said filament encircling and traversing back and forth along a portion of the axial length of said cylinder; and
    (b) feeding sheet material, from a supply thereof moving in synchronism with said rotary oscillating motion, onto said circumferential surface at a rate corresponding to the difference in said angular velocities, the length of said supply of sheet material being offset with respect to the axial length of said cylinder so that each of said turns of said filament dodges said supply during each rotary oscillation.

11. A method of making a filamentous mat, comprising:
    (a) rotating a cylinder about its axis at one angular velocity while simultaneously moving said cylinder in a rotary oscillating motion at another angular velocity about another axis intersecting said cylinder axis;
    (b) moving a roll of sheet material, disposed adjacent the surface of said cylinder with its axis parallel to said cylinder axis, in a path and at a rate that said roll axis remains parallel to said cylinder axis;
    (c) feeding a filament to said cylinder for winding around and back and forth along a portion of the axial length of said cylinder to build up said filamentous mat; and
    (d) simultaneously feeding said sheet material from said roll onto said cylinder, the length of said roll being disposed with respect to the length of said cylinder that said filament loops around and avoids an end of said roll during each rotary oscillation.

12. Apparatus for making a filamentous mat, comprising:
    (a) a former;
    (b) means for rotating said former on its longitudinal axis at one angular velocity;
    (c) means for moving said former in a rotary oscillating motion, about another axis intersecting said longitudinal axis, at another angular velocity;
    (d) means for feeding a filament to the circumferential surface of said former for winding thereon;
    (e) a roll of sheet material mounted with its axis parallel to said former longitudinal axis and adjacent said circumferential surface, the leading edge of said sheet material being attached to said circumferential surface; and
    (f) means for moving said roll in synchronism with said former in its rotary oscillating motion so that said roll axis remains parallel to said former longitudinal axis and said sheet material unwinds from said roll onto said circumferential surface at a rate in accordance with the difference in said angular velocities.

13. Apparatus for making a filamentous mat, comprising:
    (a) a drum;
    (b) means for rotating said drum upon its longitudinal axis at one angular velocity;
    (c) means for oscillating said drum in a rotary motion at a different angular velocity about a second axis intersecting the mid-point of said longitudinal axis at an acute angle;
    (d) a furnace containing molten glass disposed generally above said drum and including orifices in its bottom wall through which glass filaments are adapted to be drawn from and wound upon said drum;
    (e) a roll of sheet material mounted with its axis parallel to the axis of said drum and adjacent said circumferential surface, the leading edge of said sheet material being attached to said circumferential surface; and
    (f) means for moving said roll in synchronism with said cylinder in its rotary oscillating motion so that said roll axis remains parallel to said cylinder axis and said sheet material unwinds from said roll onto said circumferential surface at a rate in accordance with the difference in said angular velocities.

14. The apparatus of claim 13 wherein:
    (a) said roll is mounted with its lengthwise dimension offset with respect to the lengthwise dimension of that portion of the drum upon which the filaments are wound so that said filaments will be wound, durin each oscillation of said drums, on a portion of the length of said drum beyond the end of said roll.

References Cited by the Examiner
UNITED STATES PATENTS

| | | | |
|---|---|---|---|
| 2,574,221 | 11/1951 | Modiglini | 156—171 X |
| 3,046,170 | 7/1962 | Toulmin | 156—169 X |
| 3,072,513 | 1/1963 | Schlarb | 156—174 X |
| 3,112,234 | 11/1963 | Krupp | 156—169 |
| 3,140,158 | 7/1964 | Courtney | 242—2 |

DONALL H. SYLVESTER, *Primary Examiner.*

R. L. LINDSAY, *Assistant Examiner.*